(12) United States Patent
Gebele et al.

(10) Patent No.: US 7,186,997 B2
(45) Date of Patent: Mar. 6, 2007

(54) DEVICE AND METHOD FOR READING OUT INFORMATION STORED IN A STORAGE LAYER, AND X-RAY CARTRIDGE

(75) Inventors: Herbert Gebele, Sauerlach (DE); Jurgen Muller, Munich (DE); Hans Schaller, München (DE); Werner Stahl, Heimstetten (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 774 days.

(21) Appl. No.: 10/168,492

(22) PCT Filed: Dec. 16, 2000

(86) PCT No.: PCT/EP00/12853

§ 371 (c)(1),
(2), (4) Date: Sep. 17, 2002

(87) PCT Pub. No.: WO01/48513

PCT Pub. Date: Jul. 5, 2001

(65) Prior Publication Data
US 2003/0057389 A1    Mar. 27, 2003

(30) Foreign Application Priority Data
Dec. 23, 1999   (DE) ................................. 199 62 774

(51) Int. Cl.
*G03B 42/04*    (2006.01)
(52) U.S. Cl. .................................... 250/588
(58) Field of Classification Search ................ 250/588, 250/484.2, 459.1, 458.1, 584, 585, 586, 587, 250/589
See application file for complete search history.

(56) References Cited

U.S. PATENT DOCUMENTS

| 4,439,682 | A | 3/1984 | Matsumoto et al. |
| 4,584,483 | A | 4/1986 | Kato |
| 4,786,808 | A | 11/1988 | Saito |
| 5,013,916 | A | 5/1991 | Umemoto et al. |
| 5,038,037 | A | 8/1991 | Saotome |
| 5,434,431 | A | 7/1995 | Verbeke et al. |
| 6,373,074 | B1 | 4/2002 | Mueller et al. |
| 2003/0173532 | A1* | 9/2003 | Takahashi et al. .......... 250/584 |

FOREIGN PATENT DOCUMENTS

| DE | 41 02 445 C1 | 3/1992 |
| DE | 43 30 784 A1 | 3/1995 |
| DE | 197 52 925 A1 | 6/1999 |
| EP | 0 170 005 A1 | 2/1986 |
| EP | 0 288 014 A2 | 10/1988 |
| EP | 0 288 014 A3 | 10/1988 |
| EP | 0 482 676 A1 | 4/1992 |
| EP | 0 598 949 A1 | 6/1994 |
| EP | 0 288 014 B1 | 8/1998 |
| WO | WO 99/28765 | 6/1999 |

* cited by examiner

*Primary Examiner*—Otilia Gabor
(74) *Attorney, Agent, or Firm*—Houston Eliseeva LLP

(57) ABSTRACT

A device and a method for reading out information stored in a storage layer (15), and an X-ray cassette are proposed which make use for the purpose of erasing information stored in the storage layer (15) of an erasing means (11, 12, 14) which generates an erasure radiation (17). This erasure radiation (17) can have both a first and a second intensity, the first intensity being larger than the second intensity.

14 Claims, 4 Drawing Sheets

DEVICE AND METHOD FOR READING OUT INFORMATION STORED IN A STORAGE LAYER, AND X-RAY CARTRIDGE

FIELD OF THE INVENTION

The present invention relates to a device and a method for reading out information stored in a storage layer, and to an X-ray cassette.

BACKGROUND OF THE INVENTION

Particularly for medical purposes, an image which is stored in a storage layer as a latent image is produced from an object, for example a patient, by means of X-ray radiation. It is mostly a phosphor layer which is used as the storage layer in this case. The storage layer is excited by means of a radiation source in order to read out the X-ray image stored in the storage layer. Therefore, on the basis of this excitation the storage layer emits light which has an intensity corresponding to the stored X-ray image. The light emitted by the storage layer is received by a receiving means and subsequently converted into electric signals such that the X-ray image stored in the storage layer can subsequently be visualized. The X-ray image can be displayed, for example, directly on a monitor, or else be written onto a photographic X-ray film which can be used specifically for X-ray images. After the X-ray image has been read out from the storage layer, the latter is erased by an erasing device, in order to be able to store a subsequent X-ray image.

Such storage layers can be arranged in an X-ray cassette. European patent EP 0 288 014 B1 discloses erasing a storage layer which is located in an X-ray cassette. The X-ray cassette contains an opening mechanism such that the X-ray cassette can be opened in order to erase information stored in the storage layer. Present outside the X-ray cassette is an erasing means which outputs an erasure radiation. This erasure radiation is irradiated into the open X-ray cassette and projected onto the storage layer. The irradiation of the storage layer by means of the erasure radiation erases the information stored in the storage layer. The known X-ray cassette contains a reflector or a diffusing means for the purpose of reflecting the erasure radiation irradiated into the cassette, and of scattering it over the width of the storage layer.

A device for reading out information stored in a storage layer is disclosed in patent U.S. Pat. No. 5,038,037. An X-ray table for X-raying patients is described therein. The X-ray table contains two phosphor layers which are fitted on the top side and underside of a tape and serve for storing X-ray information. Both for the phosphor layer fitted on the top side and for that fitted on the underside of the tape, the known X-ray table has a dedicated device for reading out information from this phosphor layer. Furthermore, the X-ray table contains two erasing means which are used to erase the phosphor layers. A dedicated erasing means is provided for each of the phosphor layers. Serving as erasing means is an erasing lamp which—viewed in the transport direction of the tape—is arranged upstream of that point at which the X-ray image of the patient is taken. As a result, an "old" X-ray image stored in the phosphor layer is erased before a "new" X-ray image is taken. A plurality of erasing lamps arranged next to one another are likewise used as erasing means, being arranged in the X-ray table below that position at which the X-ray image is projected onto the stationary tape with the phosphor layers. Before the taping of a "new" X-ray image, the "old" X-ray image is therefore firstly erased with the aid of this erasing means, the tape being stationary. In this type of erasing means, the phosphor layer cannot be used directly for a "new" picture. The erasure of the phosphor layers does not take place until immediately before the subsequent taking of a "new" X-ray image. This means that time is lost and tuning takes place between the operations of erasure and subsequent storage. The erasure must firstly be terminated before the next X-ray image can begin to be taken.

Patent application WO 99/28765 discloses an X-ray cassette in which both a device for reading out information stored in the storage layer and an erasing means for erasing information stored in the storage layer are present. The erasing lamp extends over the entire width of the storage layer in which information can be stored. By means of a drive, the erasing means is guided over the storage layer along a transport direction running perpendicular to the line direction. The storage layer can be erased in this way line by line.

SUMMARY OF THE INVENTION

It is the object of the present invention to permit in a simple and effective way erasure of information stored in a storage layer, and a high quality of reproduction of stored information.

It is possible on the basis of the configuration according to the invention to avoid, or at least reduce, the occurrence of ghosts in the storage layer. Such ghosts can occur when the device according to the invention or the X-ray cassette is exposed to the scattered radiation of other X-ray machines which can be located, for example, in the vicinity. Such scattered radiations can certainly be very slight individually, but the addition of scattered radiations from a plurality of X-ray images of other X-ray machines can nevertheless accumulate to form visible ghosts in the storage layer. Moreover, conventional storage layers can contain small quantities of radioactive isotopes such as $^{226}$Ra, which likewise emit slight amounts of radiation. These are further supplemented by natural, cosmic radiations. Particularly in the case of lengthy non-use of the storage layer, these radiations can contribute to the occurrence of the ghosts. Ghosts have a deleterious effect on the quality of the reproduction of the information read out. Ghosts can become noticeable as noise when stored information is read out. It is advantageously possible, moreover, to ensure on the basis of the invention that storage of "new" information is possible without the need to undertake prior erasure immediately before storage. There is no need to tune the erasing operating to the storage operation.

The erasing means advantageously outputs an erasure radiation of a larger, first intensity immediately after information of an image has been read out from the storage layer. This ensures that the storage layer is ready very quickly to take a new image after the storage of an image.

In a further advantageous refinement of the invention, the erasure radiation of a second, weaker intensity is output after the erasure radiation of the first intensity has been output. This prevents an undesired storage of scattered radiation striking the storage layer, since this scattered radiation is erased continuously by the erasure radiation.

In a particularly advantageous refinement, the erasure radiation is output onto the storage layer between the reading out of the information of a first image and the subsequent storage of information of a second image. Storage of scattered radiation and the occurrence of ghosts during the entire time between the reading out of the first image and the storage of the information of the second image are therefore avoided. The quality of the reproduction of the information is further improved thereby. Furthermore, the erasure radiation of the second intensity can be output independently of the storage of information of a new image. Tuning between the storage and the erasure with the second intensity is not required for the sake of simplicity.

It is preferable for there to be present a detection means for detecting that radiation with the aid of which information is stored in the storage layer. Consequently the erasing means can be switched off automatically when storage of information of a new image begins. For the sake of simplicity, the detection means can contain a photodiode upstream of which there is fitted a conversion layer for converting the storage radiation into a radiation that has a wavelength which can be detected by the photodiode.

BRIEF DESCRIPTION OF THE DRAWINGS

An exemplary embodiment will be described in more detail below with reference to the appended drawings, in which.

DETAILED DESCRIPTION OF THE INVENTION

Figure 1:
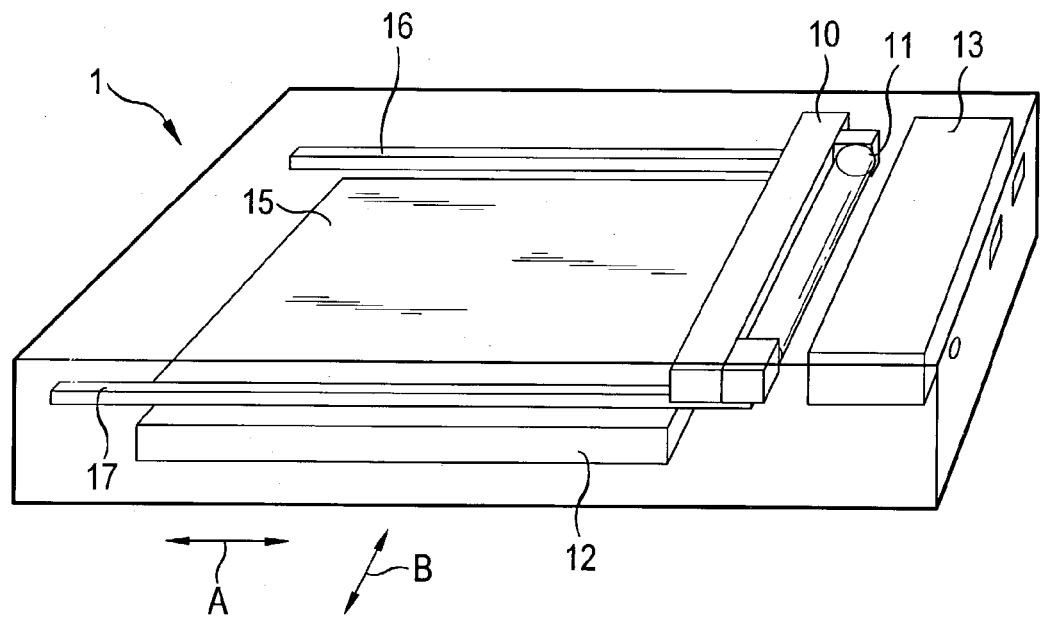
FIG. 1 shows a first exemplary embodiment of an X-ray cassette according to the invention, with an erasing source of planar configuration.

FIG. 1 shows the first exemplary embodiment of an X-ray cassette 1 according to the invention. This X-ray cassette 1 contains a storage layer 15. The storage layer 15 is a phosphor plate. X-ray images can be stored in the phosphor plate 15. The X-ray cassette 1 has a reading head 10 for reading out the X-ray images stored in the phosphor plate 15. Fitted along the longitudinal sides of the phosphor plate 15 are two guide bars 16 and 17 which serve for transporting and guiding the reading head 10. The reading head 10 can be transported by means of a drive (not illustrated) along the guide bars 16 and 17 over the surface of the phosphor plate 15 in a feed direction A. An erasing lamp 11 is located behind the reading head 10. The erasing lamp 11 is connected to the reading head 10 and can, just like the reading head 10, be transported by means of the drive (not illustrated) along the guide bars 16 and 17 over the surface of the phosphor plate 15 in the feed direction A. The erasing lamp 11 serves to erase information stored in the phosphor plate 15 which is still stored in the phosphor plate 15 after an X-ray image has been read out by means of the reading head 10. During operation, the erasing lamp 11 emits an erasure radiation of a first intensity. This first intensity is advantageously so great that a single to and fro movement of the erasing lamp 11 over the phosphor plate 15 along the direction A erases residual information, remaining in the phosphor plate 15, of the X-ray image. After the phosphor plate 15 has been erased by means of the erasing lamp 11, the X-ray cassette is ready for taking a subsequent, second X-ray image. The erasing lamp 11 and the reading lamp 10 extend in a line direction B over the entire width of the phosphor plate 15. The line direction B is perpendicular to the feed direction A.

A second erasing lamp 12 is arranged inside the X-ray cassette 1 below the phosphor plate 15. This second erasing lamp 12 is of planar configuration. The surface of the second erasing lamp 12 runs parallel to that of the phosphor plate 15. The extent of the surface of the second erasing lamp 12 corresponds essentially to that of the phosphor plate 15 in which X-ray images are stored. The erasure radiation emitted by the second erasing lamp 12 has a wavelength that lies within that wavelength region in which the phosphor plate 15 can be stimulated. The flat radiator "PLANON" marketed by the Osram company can, for example, be used as such a second erasing lamp 12 of planar configuration.

The X-ray cassette 1 further contains a control means 13 with the aid of which the components contained in the X-ray cassette 1 are driven. The control means 13 serves, in particular, to control the first erasing lamp 11 and the second erasing lamp 12. The control means 13 is used to switch the two erasing lamps 11 and 12 into an on state, in which they output erasure radiation, and into an off state, in which they do not output erasure radiation. The second erasing lamp 12 is advantageously switched into the on state by the control means 13 immediately after the phosphor plate 15 has been erased by the first erasing lamp 11. Thereafter, it continuously emits the erasure radiation of the weak, second intensity. The second intensity is advantageously so weak that its contribution to the total noise is negligible. The second erasing lamp 12 is switched into the off state by the control means 13 for the purpose of storing a new X-ray image in the phosphor plate 15. The new X-ray image can therefore be stored completely in the phosphor plate 15 without the second erasing lamp 12 already erasing even the tiniest portions of information. As already described above, the X-ray image is subsequently read out with the aid of the reading head 10, and the residual information, which continues to be stored in the phosphor plate 15 after the reading out, of the X-ray image is erased by means of the first erasing lamp 11.

It is likewise possible to leave the second erasing lamp 12 in the on state even during storage of the new X-ray image. In this case, advantageously there need not be any tuning between the second erasing lamp and the radiation source which outputs the imaging radiation with the information to be stored in the direction of the phosphor plate 15. The erasure radiation which can be output by the second erasing lamp 12 can be fashioned such that there is no longer a need to switch off the second erasing lamp 12. It is therefore unnecessary for the sake of simplicity to incorporate and tune the functioning of the second erasing lamp 12 into the operation of imaging, reading out and erasing.

Figure 2:
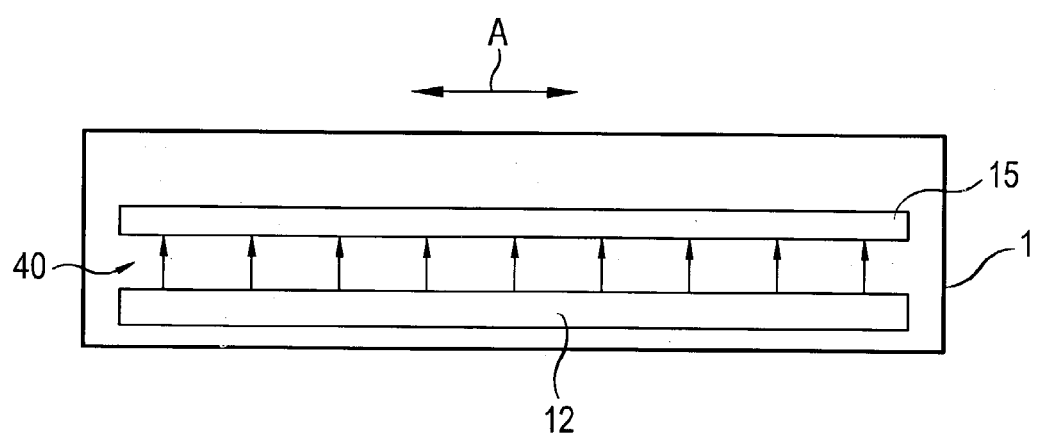
FIG. 2 shows a sectional illustration of the first exemplary embodiment of the X-ray cassette in accordance with FIG. 1.

FIG. 2 shows a schematic sectional illustration of the phosphor plate 15 and of the second erasing lamp 12 in accordance with FIG. 1. The second erasing lamp 12 is arranged parallel to the phosphor plate 15 inside the X-ray cassette 1. The second erasing lamp 12 emits, in the direction of the phosphor plate 15, an erasure radiation 40 which has the weak, second intensity.

Figure 3:
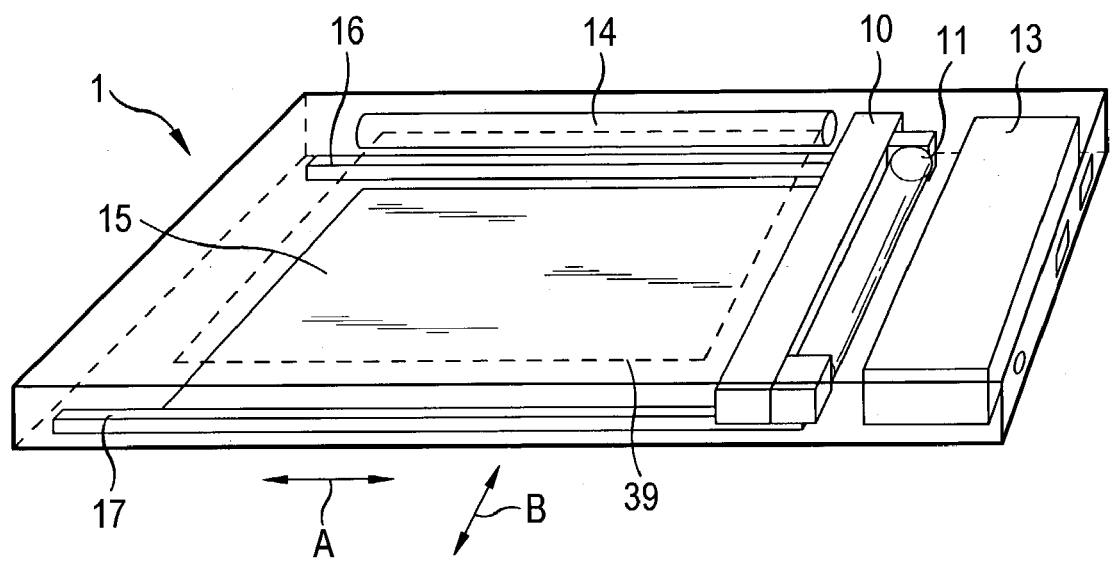
FIG. 3 shows a second exemplary embodiment of an X-ray cassette according to the invention with an erasing source fitted laterally at the edge of the X-ray cassette.

FIG. 3 shows a second exemplary embodiment of the X-ray cassette 1 according to the invention. Instead of the second erasing lamp 12 fitted below the phosphor plate 15 (FIG. 1), a third erasing lamp 14 is arranged here at the rear lateral longitudinal wall of the X-ray cassette 1. This third erasing lamp 14 is located laterally next to the phosphor plate 15 and extends along the longitudinal side thereof. A planar reflector 39 is arranged parallel to the phosphor plate 15 on the inside of the top cover of the X-ray cassette 1. The reflector 39 can be a mirror, for example.

The third erasing lamp 14 has the same function as the second erasing lamp 12 of the first exemplary embodiment in accordance with FIG. 1. It emits erasure radiation of the weak, second intensity. This weak erasure radiation can be radiated partially by the third erasure lamp 14 directly onto the phosphor plate 15, or else can be directed by the third erasing lamp 15 onto the reflector 39 and be reflected thereby, in turn, in the direction of the phosphor plate 15. The erasure radiation output by the third erasing lamp 14 is distributed in this way over the entire surface of the phosphor plate 15. The entire surface of the phosphor plate 15 is reached by the second erasure radiation 17 because of the arrangements of the erasing lamp 14 and the reflector 39.

Figure 4:
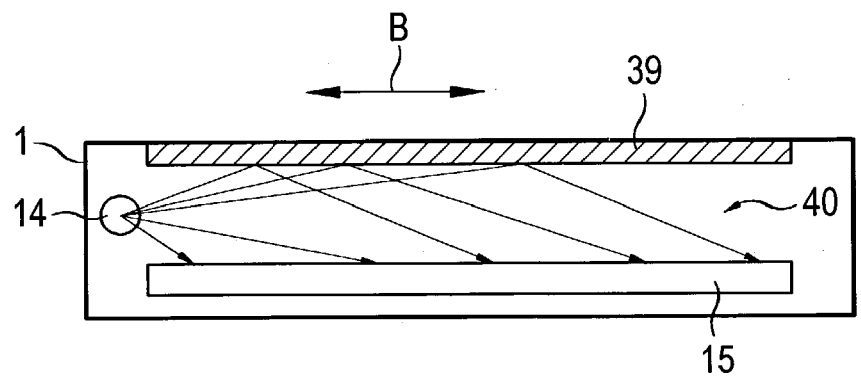
FIG. 4 shows a sectional illustration of the second exemplary embodiment of the X-ray cassette in accordance with FIG. 3.

FIG. 4 shows a schematic sectional illustration of the X-ray cassette 1 in accordance with the second exemplary embodiment of FIG. 3. The X-ray cassette 1 is illustrated here sectioned in the line direction B. The third erasing lamp 14 is arranged on the left-hand side of FIG. 4. It is located in a fashion offset to the side of the reflector 39 and the phosphor plate 15, at approximately the same distance from the reflector 39 and the phosphor plate 15, inside the X-ray cassette 1.

Figure 5:
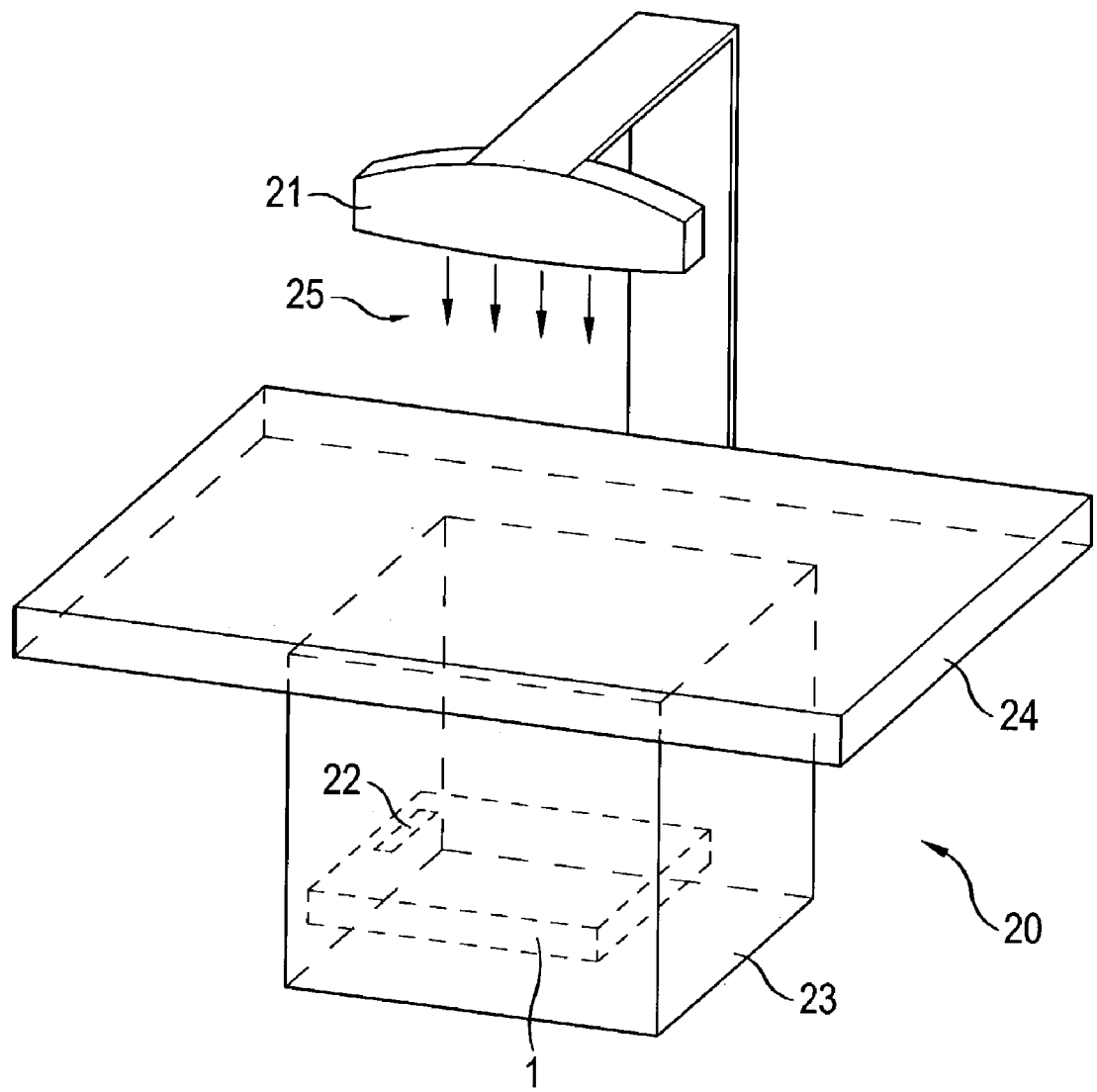
FIG. 5 shows an example of an X-ray table in which a third exemplary embodiment of an X-ray cassette according to the invention is arranged.

FIG. 5 shows an example of the-application of a third exemplary embodiment of the X-ray cassette 1 according to the invention. In this example of application, the X-ray cassette 1 is inserted in an X-ray table 20. This X-ray table 20 includes an X-ray base 23 in which the X-ray cassette 1 is located, and a supporting surface 24 arranged on this X-ray base 23. Patients are laid on this supporting surface 24 for X-rays to be taken. An X-ray source 21 is fitted on the X-ray table 20 over the supporting surface 24 and the X-ray base 23 with the X-ray cassette 1 located therein. The X-ray source 21 emits an X-ray radiation 25 in the direction of the supporting surface 24 in order to take the X-ray image. The X-ray cassette 1 present in the X-ray base 23 here contains a detection means 22 which serves as a sensor for the X-ray radiation 25. A sensor 22 can determine whether the X-ray source 21 is emitting X-ray radiation 25. The operability of the erasing means contained inside the X-ray cassette 1 can be controlled with the aid of the sensor 22.

Figure 6:
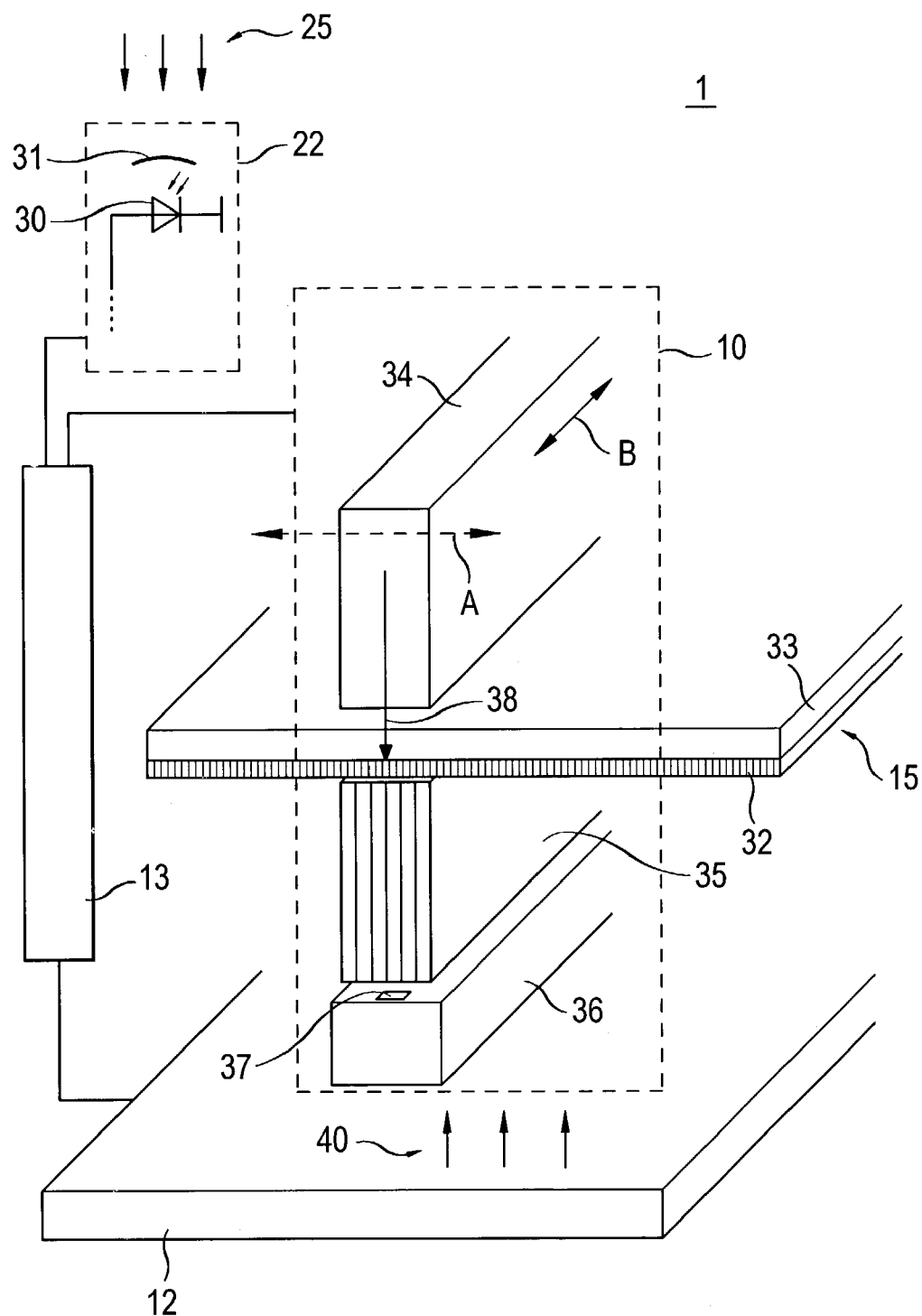
FIG. 6 shows a detailed schematic illustration of the third exemplary embodiment of the X-ray cassette with an exemplary embodiment of a reading head according to the invention.

FIG. 6 serves to illustrate further the functioning of the sensor 22 and to describe the reading head 10. FIG. 6 shows the reading head 10 and further components, present in the reading head 10, for reading out the X-ray information stored in the phosphor plate 15. The reading head 10 contains a laser diode row 34 extending along the line direction B. The laser diode row 34 serves for exciting a phosphor material 32 which is applied to a transparent substrate material 33 and forms the phosphor plate 15 together with this substrate material 33. An exciting radiation 38 output by the laser diode row 34 traverses the substrate material 33 and penetrates into the phosphor material 32. The phosphor material 32 emits an emission radiation because of this excitation of the phosphor material 32. This emission radiation is projected onto a CCD row 36 by an optical imaging means 35 which contains a multiplicity of optical conductors, for example. The CCD row 36 includes a multiplicity of light-sensitive surfaces 37 arranged in a row next to one another.

FIG. 6 further shows the sensor 22 for detecting X-ray radiation 25. The sensor 22 contains a photodiode 30 over which a scintillation layer 31 is arranged. The X-ray radiation 25 emitted by the X-ray source 21 strikes this scintillation layer 31. The scintillation layer 31 performs a wavelength conversion. The X-ray radiation 25 is converted into a radiation of a wavelength which can be detected by the photodiode 30. The sensor 22 is connected to the control means 13. The information emitted by the sensor 22 via the output of X-ray radiation 25 by the X-ray source 21 can be used by the control means 13 to drive the second erasing lamp 12. In the exemplary embodiment in accordance with FIG. 6, this second erasing lamp 12 is arranged below the phosphor plate 15, as already described in conjunction with FIG. 1.

If the second erasing lamp 12 is in its on state, such that it outputs weak erasure radiation 40 in the direction of the phosphor plate 15, the second erasing lamp 12 can then be switched into the off state by the control means 13 when the sensor 22 establishes that the X-ray source 21 is emitting X-ray radiation 25 for the purpose of renewed storage of an X-ray image in the phosphor plate 15. The second erasing lamp 12 can be switched off automatically in this way such that there is no erasure with the second erasure radiation 40 during the taking of a new X-ray image.

Instead of the photodiode 30 and the scintillation layer 31, the sensor 22 can also be configured otherwise. The configuration by means of the photodiode 30 and the scintillation layer 31 constitutes a variant of the sensor 22 which is particularly easy to implement.

Two erasing lamps 11 and 12 or 14 are used in the previously described exemplary embodiments for the purpose of erasing the phosphor plate 15 by means of the strong and the weak erasure radiation. Instead of two erasing lamps, it is likewise possible to make use of a single erasing lamp, or else also of more than two erasing lamps. In the case of a single erasing lamp, the latter is configured in such a way that it outputs both the weak and the strong erasure radiation.

We claim:

1. Method for reading out information stored in a storage layer, comprising:

erasing information stored in the storage layer using erasure radiation, wherein the erasure radiation includes erasure radiation produced by a first source and having a first intensity and erasure radiation produced by a second source and having a second intensity, and wherein the first intensity is larger than the second intensity, and outputting erasure radiation onto the storage layer at least during the entire period between the reading out of the information of a first image stored in the storage layer and the subsequent storage of information of a second image in the storage layer.

2. Device for reading out information stored in a storage layer, comprising an erasing means for erasing information stored in the storage layer by means of an erasure radiation, characterized in that the erasing means comprises a single erasing source being configured in such a way that the erasure radiation which can be output by the single erasing source can adopt a first and a second intensity, and the first intensity is larger than the second intensity, the device further including control means for driving the single erasing source such that it can be switched into an on state in which the erasure radiation is output onto the storage layer and into an off state in which no erasure radiation is output onto the storage layer.

3. Device according to claim 2, characterized in that the single erasing source is configured in such a way that it outputs the erasure radiation of the second intensity after the erasure radiation of the first intensity has been output.

4. Device according to claim 2, characterized in that the single erasing source is configured in such a way that it outputs the erasure radiation onto the storage layer at least between the reading out of the information of a first image stored in the storage layer and the subsequent storage of information of a second image in the storage layer.

5. Device according to claim 2, characterized in that the single erasing source is configured in such a way that erasure radiation of the second intensity can be output onto the storage layer in operation during the storage of information in the storage layer.

6. Device according to claim 2, characterized in that the single erasing source is of planar configuration whose surface is arranged parallel to the storage layer.

7. Device according to claim 6, characterized in that the surface for outputting the erasure radiation has at least the magnitude of the storage layer.

8. Device according to claim 2, characterized in that the single erasing source is arranged laterally next to the storage layer.

9. Device according to claim 8, further including a reflector for reflecting the erasure radiation generated by the laterally arranged single erasing source, and the reflector is arranged such that erasure radiation reflected by the reflector is directed onto the storage layer during operation.

10. Device according to claim 2, further including a detection means for detecting a storage radiation which serves for storing the information in the storage layer.

11. Device according to claim 10, characterized in that the detection means is connected to the control means for driving the single erasing source such that it can be switched into an on state in which the erasure radiation is output onto the storage layer and into an off state in which no erasure radiation is output onto the storage layer.

12. Device according to claim 10, characterized in that the detection means has a photodiode and a conversion layer for converting the storage radiation into a radiation which can be detected by the photodiode.

13. X-ray cassette having a storage layer for storing information, and a device according to claim 2.

14. Method for reading out information stored in a storage layer, the information stored in the storage layer being erased by means of an erasure radiation, characterized in that the erasure radiation is output by a single erasing source and adopts a first and a second intensity, and the first intensity is larger than the second intensity.

* * * * *